United States Patent [19]

Gehring et al.

[11] Patent Number: 4,715,626
[45] Date of Patent: Dec. 29, 1987

[54] CLAMPING SLEEVE WITH A CLAMPING SCREW

[75] Inventors: Manfred Gehring, Freudenstadt, Fed. Rep. of Germany; Heinz Plüss, Courtaman, Switzerland

[73] Assignee: Mage AG, Switzerland

[21] Appl. No.: 775,483

[22] Filed: Sep. 12, 1985

[30] Foreign Application Priority Data

Sep. 27, 1984 [DE] Fed. Rep. of Germany ....... 3435368
Jul. 3, 1985 [DE] Fed. Rep. of Germany ..... 85108205

[51] Int. Cl.⁴ ............................................. F16L 49/00
[52] U.S. Cl. .................... 285/230; 285/236; 285/373; 411/427; 411/537
[58] Field of Search ............... 285/236, 373, 367, 253, 285/410, 411, 177, 419, 230; 24/279, 20 EE, 20 TT; 411/537, 538, 435, 427

[56] References Cited

U.S. PATENT DOCUMENTS

| 700,704 | 5/1902 | Parker | 285/410 |
|---|---|---|---|
| 1,278,598 | 9/1918 | Cooper | 285/253 |
| 1,641,559 | 9/1927 | Thompson | 24/279 |
| 2,417,741 | 3/1947 | Dillon | 24/279 |
| 2,697,570 | 12/1954 | Snyder | 285/367 |
| 3,134,155 | 5/1964 | Kreidel, Sr. et al. | 24/279 |
| 3,220,289 | 11/1965 | Farekas | 411/537 |
| 3,238,581 | 3/1966 | Sawyer | 411/537 |
| 3,419,291 | 12/1968 | Tomb et al. | 285/236 |
| 3,533,650 | 10/1970 | Smith | 285/373 |
| 3,572,773 | 3/1971 | Read | 285/236 |
| 3,801,141 | 4/1974 | Hollingsworth | 285/236 |
| 3,834,744 | 9/1974 | Masatchi | 24/279 |
| 4,165,109 | 8/1979 | Foti | 285/177 |
| 4,261,600 | 4/1981 | Cassel | 285/177 |
| 4,463,975 | 8/1984 | McCord | 285/419 |
| 4,521,940 | 6/1985 | Oetiker | 24/279 |

FOREIGN PATENT DOCUMENTS

| 136899 | 1/1933 | Austria. | |
|---|---|---|---|
| 57373 | 8/1982 | European Pat. Off. | 285/236 |
| 79457 | 5/1983 | European Pat. Off. | 285/373 |
| 1923950 | 5/1969 | Fed. Rep. of Germany. | |
| 2157192 | 7/1972 | Fed. Rep. of Germany | 285/236 |
| 7406823 | 2/1974 | Fed. Rep. of Germany. | |
| 3326070 | 5/1984 | Fed. Rep. of Germany. | |
| 1011740 | 3/1949 | France. | |
| 1091978 | 1/1954 | France. | |
| 1260979 | 6/1960 | France. | |
| 250454 | 3/1946 | Switzerland. | |
| 4533 | of 1892 | United Kingdom | 285/253 |
| 2149037 | 6/1985 | United Kingdom | 285/253 |

OTHER PUBLICATIONS

Brochures 383/D and 384/D of Messrs. Walter Eckold GmbH & Co. KG in D-3424 St. Andreasberg, Federal Republic of Germany.

*Primary Examiner*—Richard J. Scanlan, Jr.
*Assistant Examiner*—Anthony Knight
*Attorney, Agent, or Firm*—McCormick, Paulding & Huber

[57] ABSTRACT

A clamping sleeve for pipes consists of a rubberelastic sealing ring (1) and a clamping ring (2) which encircles the sealing ring and has clamping plates (5) which are directed radially outward, are located opposite one another and are penetrated by a centrally arranged clamping screw (6). The clamping screw (6) is supported on the clamping plates by intermediate pieces (8, 9), of which one is arranged between the head (7) of the clamping screw and the clamping plate, whereas the other directly forms the nut for the clamping screw. The intermediate pieces (8, 9) have a cylindrical cross-section, so that they sit with a cylindrical surface against the adjacent clamping plate (5). Furthermore, the position of the intermediate pieces (8, 9) is fixed at the clamping plate (5) by stops (11, 12). The swivelling capacity of the intermediate pieces (8, 9) relative to the clamping plates (5) makes possible an inclined position of the clamping plates (5) relative to the clamping screw (6) and relative to one another. In this way, despite the use of only one clamping screw, perfect seating of the clamping sleeve is also ensured when pipes to be connected to the clamping sleeve have different diameters within the tolerance range.

17 Claims, 9 Drawing Figures

CLAMPING SLEEVE WITH A CLAMPING SCREW

The invention relates to a clamping sleeve for pipes, having a rubber-elastic sealing ring which, at each of its ends, has at least one beading projecting radially inward and a clamping ring which encircles the sealing ring and is in the form of a sheet-metal strip bent in circular shape, on the ends of which are attached clamping plates which are directed radially inward, are located opposite one another and are penetrated by a centrally arranged clamping screw.

Such a clamping screw is known from the German Offenlegungsschrift No. 1,923,950. In this clamping sleeve, guide pins are arranged on both sides of the central clamping screw, which guide pins hold the clamping plates parallel to one another and consequently are intended to prevent canting of the clamping plates when the clamping screw is being tightened, so that the frictional forces caused by such canting and acting on the screw remain as small as possible. However, the through holes for the guide pins are to have an oblong cross-section in the axial direction of the clamping sleeve to permit canting of the clamping plates relative to one another in the axial direction which always occurs when the pipes to be connected by means of the clamping sleeve have different diameters from one another. Rigid parallel guidance of the clamping plates would then prevent a sound seal of the pipe which is smaller in diameter. However, because of the arrangement of slotted holes for the guide pins, the effect of the guide pins is again counteracted to a decisive extent, so that, in the case which occurs very frequently of the pipes to be connected to one another having different diameters, considerable sticking of the clamping screw nevertheless occurs again, whereby the clamping screw is excessively overloaded on the one hand and on the other hand the establishment of a sound connection is endangered.

The abovementioned difficulties occur to a reduced extent in such clamping sleeves in which the clamping plates are penetrated by two clamping screws which are arranged near to the edges of the clamping sleeve and which can be tightened alternately and thus ensure a sound seal at each edge of the clamping sleeve. The frictional forces acting on the individual clamping screws are then also not so high that they seriously impede correct tensioning. On the other hand, attaching two clamping screws instead of one causes not only additional costs during manufacture but also an increased work effort in attaching such a clamping sleeve. Moreover, it requires greater craftsmanship to tighten alternately two parallel screws uniformly than to tighten only one central screw.

Accordingly, the object of the invention is to design a clamping sleeve of the type mentioned at the beginning in such a way that, despite the use of only one clamping screw, frictional forces do not occur which impede the tightening of the screw and impair in particular the required uniform seating at both edges of the clamping sleeve.

This object is achieved according to the invention in that the clamping screw is supported at the clamping plates by intermediate pieces which are pivotable about an axis directed essentially radially to the clamping sleeve.

In the clamping sleeve according to the invention, therefore, inadmissible frictional forces are not to be kept away from the clamping screw by the clamping plates being held automatically parallel to one another, which cannot be achieved at all in the desirable manner, but rather care is taken to ensure that, in an inclined position of the clamping plates, bending forces cannot be transmitted to the screw which lead to inadmissible frictional forces between the clamping screw and the bores accommodating the clamping screw. On the contrary, the intermediate pieces form an articulated connection between the screw and the clamping plates which enables the clamping screw to assume an inclined position relative to the clamping plates without canting occurring between the clamping screw and its mounting bores and without the transference of the clamping forces from the clamping screw onto the clamping plates and thus onto the clamping ring being impaired. Thus, by the same token, the clamping plates are free to take up an inclined position, especially with respect to the axis of the clamping plate, as is required in order to achieve a sound seal at the two sealing ring edges provided inwardly projecting beadings. At the same time, essentially the same clamping forces are exerted at both edges of the sealing ring, because the claping ring is free to adapt itself automatically to the position of equilibrium in which the clamping forces acting at its edge are equal. By means of the invention, a clamping sleeve is thus created which, because of the presence of only one clamping screw, is very inexpensive in manufacture and also in handling, and at the same time ensures an optimum sealing of the pipes to be connected to one another, especially when these pipes have different diameters, as frequently occurs as a result of the considerable tolerance ranges, especially in concrete pipes to be connected to one another.

The intermediate pieces can be pivotably mounted relative to the clamping plates in different ways. A particularly simple type of mounting is obtained if the intermediate pieces each sit with a cylindrical surface against the outer side of the adjacent clamping plate. In this way, additional mounting arrangements are dispensed with. At the same time, such an arrangement is particularly resistant. The intermediate pieces can simply be provided with a through hole and be arranged on the one side between the screw head and the clamping plate and on the other side between a nut, arranged on the screw, and the clamping plate. However, it is also possible to make the intermediate piece arranged on the end of the clamping screw directly as a nut for the clamping screw.

Apart from the fact that the intermediate piece has a cylindrical surface facing towards the adjacent clamping plate, in other words has to be spherically made on the side facing towards the clamping plate, the form of the intermediate piece is optional and can therefore be selected with regard to a particularly expedient manufacture. Thus the intermediate piece can have a cylindrical cross-section, because, for manufacturing the intermediate pieces, a bar material can then be used on which a cylindrical surface need not first be made. However, such a cylindrical form also offers the possibility of making the intermediate piece as a pipe-like bent part, in the wall of which through holes or threaded holes are arranged which are located radially opposite one another. Such holes can then be made or prepared in a flat material strip even before the material strip is bent, if possible by a fully automatic process, into a pipelike intermediate piece.

In a preferred embodiment of the invention, the intermediate pieces have a semi-cylindrical cross-section, so that they can be made particularly simply and with a minimum of material expenditure from a flat material strip and, what is more, have the particular advantage that they provide the head of the clamping screw, and if necessary a screw nut sitting on the other end of the clamping screw, with a flat stop surface. At the same time, the clamping screw can interact in particular with a screw nut which sits with a linear edge section against a projection attached to the flat stop surface of the intermediate piece. For this purpose, it is particularly advantageous if the screw nut has a square plan outline.

As explained above, the arrangement of the pivotable intermediate pieces has a purpose of permitting an inclined position of the clamping screw relative to the clamping plates. Consequently, the through holes, arranged in the clamping plates, for the clamping screw must have a considerably greater diameter than the clamping screw itself or can be advantageously made as slottted holes extending parallel to the clamping ring, so that the clamping screw in the clamping plates does not have any appreciable guidance in the axial direction of the clamping sleeve. To avoid difficulties caused by this, a preferred embodiment of the invention provides that the intermediate pieces are held between lateral stops attached to the clamping plates. This ensures that the intermediate pieces are fixed in position by the clamping screw relative to the center of the clamping plates, which is of advantage for both handling and the functional reliability of the clamping sleeve according to the invention. These stops can be formed in a particularly simple manner in that tangs are arranged at the outer edges of the clamping plates and are bent in a U-shape, so that legs formed by these tangs extend as stops next to the intermediate pieces.

In addition, the intermediate pieces can also be held radially to the clamping sleeve between the clamping ring and a stop arranged on the outer edge of the adjacent clamping plate. Similarly to the lateral stops, the upper stop can also be formed by a tang which projects from the outer edge of the clamping plate and grips over the adjacent intermediate piece.

For the design of the clamping plates having the stops for the intermediate pieces, it is particularly advantageous if the clamping plates are formed by the bent ends of rigid sheet-metal parts attached on the clamping ring. Such sheet-metal parts can be made in simple manner as stamping bent parts from a material of sufficiently high rigidity to meet the set strength requirements. Moreover, the bent tangs dealt with above give such a bent part considerable rigidity if it is made of a relatively thin material. However, the sheet-metal parts are made from a considerably thicker material than the clamping ring, which must be sufficiently flexible to sit fully against the periphery of the elastic sealing ring.

In a further embodiment of the invention, such a sheet metal part, in its section sitting against the clamping ring, can have a cut-out extending up to the clamping plate, into which cut-out engages the adjacent end of the intermediate piece. In this way an additional guidance of the intermediate piece at its end adjacent to the clamping ring is achieved and, in addition, the particular advantage is obtained that the clamping forces are transmitted directly from this end of the intermediate piece onto the clamping plate edge sitting against the clamping ring, where they act directly in the clamping direction without any tilting moments occurring. In this way, the mode of operation of the clamping sleeve according to the invention is further improved.

The sheet metal parts and the clamping ring can be connected by standard methods, in particular by riveting or welding. Fixing the sheet-metal parts to the clamping ring by means of so-called pressure-joint connections has been shown to be particularly advantageous, which pressure-joint connections especially have a very high shearing resistance and can be made with simple tools. In particular, structural variations in the materials which can impair the long-time behavior of the connection, as is to be feared in welded connections, do not occur in the manufacture of a pressure-joint connection. Pressure-joint technology is described, for example, in the leaflets 383/D and 384/D of Walter Eckold GmbH and Company KG. in 3424 St. Andreasberg.

Attaching sheet-metal parts to the clamping ring has the further advantage that they provide the possibility of arranging one of the sheet-metal parts at a distance from the end of the clamping ring, so that a clamping ring section projecting beyond the sheet-metal part can form a bridge overlapping the other end of the clamping ring. The attachment of a special bridge, which is normal in such clamping sleeves, is avoided by this measure. Moreover, it is more favorable for the clamping characteristic if the clamping ring itself is formed by an uninterrupted material strip which can have edges bent inward on its entire length, so that the sealing ring is safely held between these edges and the clamping sleeve, consisting of the sealing ring and the clamping ring, can always be handled as a constructional unit.

The invention is described and explained in greater detail below with reference to the illustrative embodiment shown in the drawing. In other embodiments of the invention, the features to be taken from the description and the drawing can be used individually by themselves or severally in any combination. In the drawing.

Figures 3, 4:
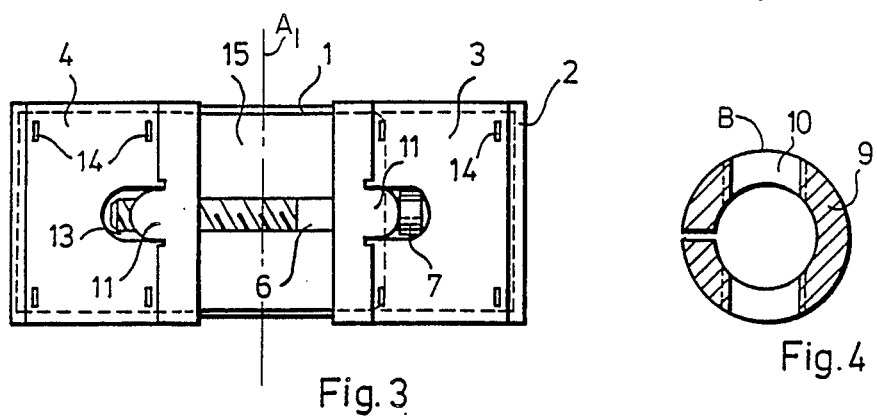
Figures 5, 6:
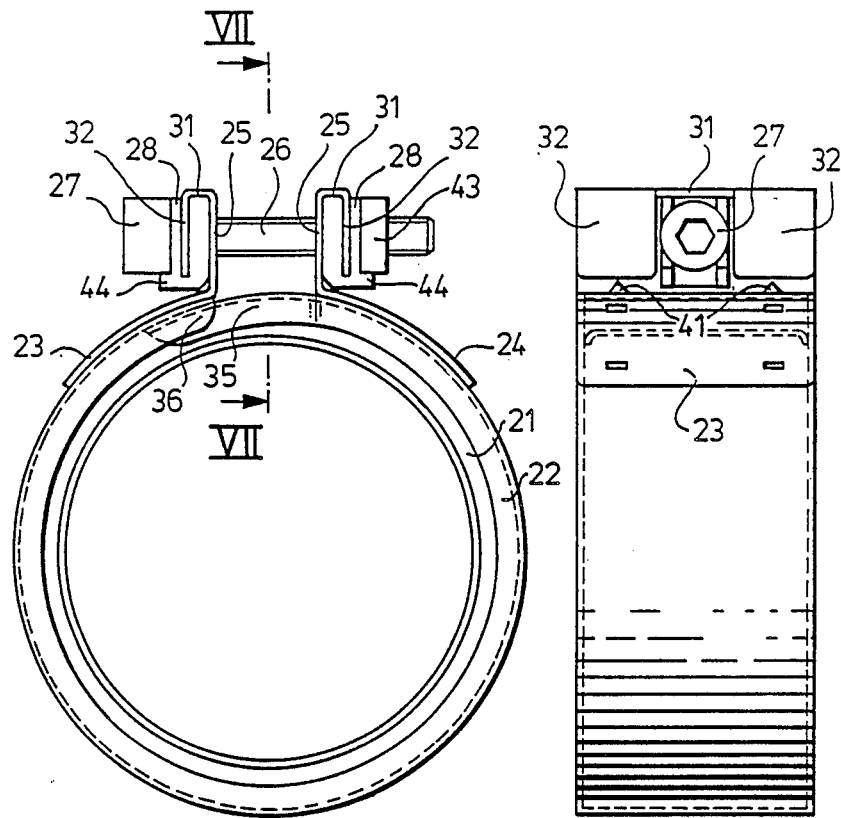
Figures 7, 8:
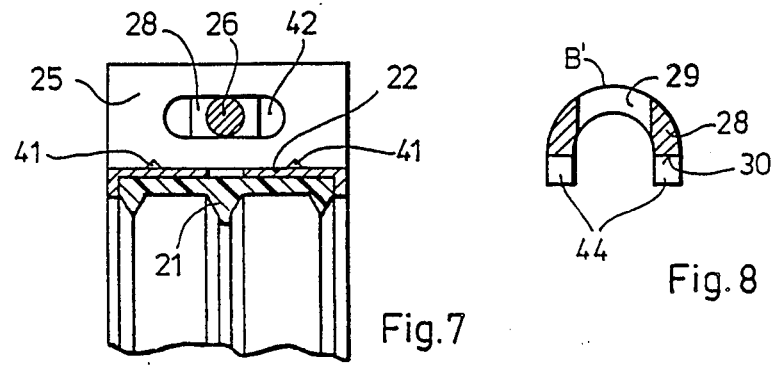

FIG. 3 shows the plan view of a first embodiment of a clamping sleeve according to the invention, FIG. 4 shows a cross-section to an enlarged scale through an intermediate piece used in the clamping sleeve according to FIGS. 1 to 3, FIG. 5 shows the side view, and FIG. 6 shows the front view of a second embodiment of such a clamping sleeve, FIG. 7 shows a section along line VII—VII through the clamping sleeve according to FIG. 5, and FIG. 8 shows a cross-section similar to FIG. 4 through the intermediate piece used in the clamping sleeve according to FIGS. 5 to 7.

Figures 1, 2:
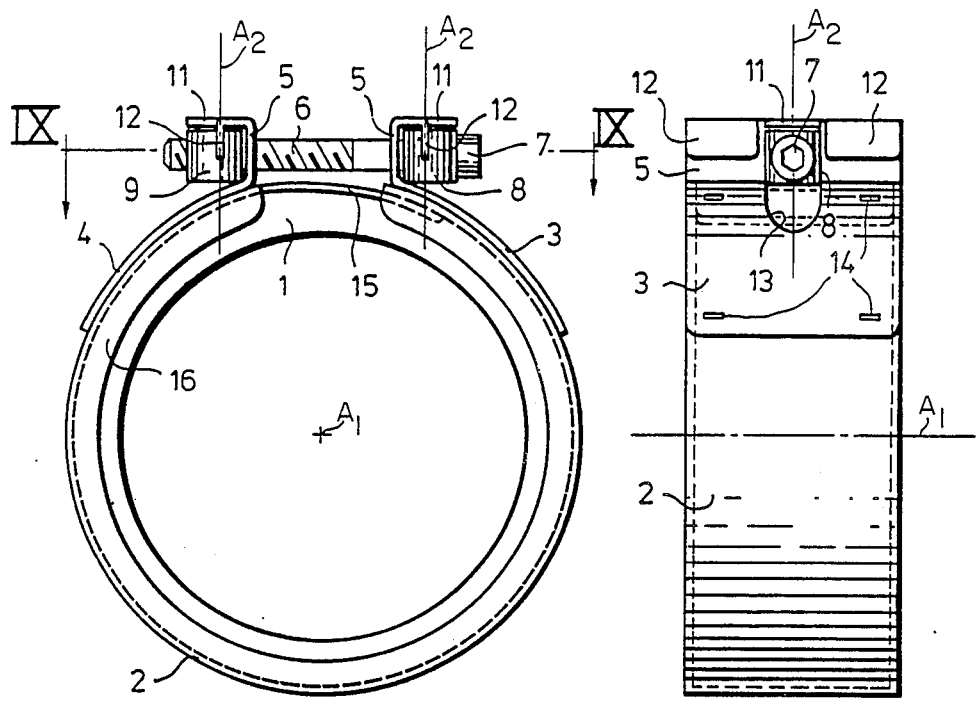
FIG. 1 shows the side view.
FIG. 2 shows the front view.
Figure 9:
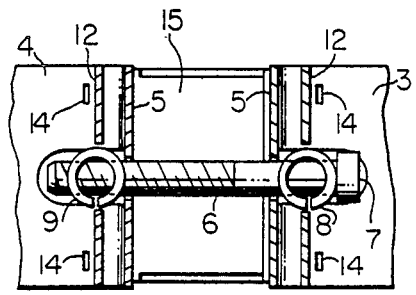

FIG. 9 is a fragmentary sectional view taken along the line IX—IX of FIG. 1.

The clamping sleeve shown in the drawing having a rubber-elastic sealing ring 1 and a clamping ring 2 which encircles the sealing ring and is in the form of a sheet-metal strip bent in a circular shape about a central axis $A_1$ and on the outer side of which are fixed two sheet-metal parts 3 and 4, the ends of which facing towards one another, are bent and form clamping plates 5 which are located parallel to one another and at a distance opposite one another. These clamping plates are penetrated by a central clamping screw 6 which is supported at its head 7 on the respective outer side of the clamping plate 5 by an intermediate piece 8 and at its other end by an intermediate piece 9 designed as a nut.

The intermediate pieces 8 and 9, as can be seen in particular from FIG. 4, have a cylindrical cross-section, a partially cylindrical bearing surface B for engaging an associated clamping plate 5, and, in the illustrative embodiment shown, are made as pipe-like bent parts. In the intermediate piece 9 shown in FIG. 4, threaded bores 10 are located at the walls, which threaded bores 10 correspond to a thread in the clamping screw 6, whereas corresponding through holes for the clamping screw 6 are located in the intermediate piece 8, against which sits the clamping screw 6 with its head 7. In the design of the intermediate pieces 8 and 9 as pipe-like bent parts, the holes used for making the threaded bores and the through bores can be punched into a flat material strip, after which the material strip is bent into the cylindrical form shown in FIG. 4. In this way, the manufacture of the intermediate pieces can be considerably simplified and considerably reduced in cost.

The ends of the rigid sheet metal parts 3 and 4 attached onto the clamping ring are again bent following the sections forming the clamping plates and in fact once in the center area and then twice following the center area, so that tangs 11 project from the clamping plates 5 in their center area, which tangs 11 grip over the ends of the intermediate pieces 8 and 9 and in this way form stops for the intermediate pieces. The sections placed next to the tangs 11 are bent in a U-shape in such a way that the legs 12 of these sections are arranged laterally next to the intermediate pieces 8 and 9 and form lateral stops for these intermediate pieces. Furthermore, a cut-out 13 is arranged in each of the sections of the sheet-metal parts 3 and 4 sitting against the clamping ring, the inside diameter of which cut-out 13 is equal to the diameter of the intermediate pieces 8 and 9 and extends up to the respective clamping plate. The intermediate pieces 8 and 9 engage in these cut-outs 13 and consequently receive an additional lateral guidance. These cut-outs also ensure that the intermediate pieces extend up to the surface of the clamping ring 2 and the clamping forces transmit onto the clamping plates 5 into the area of the bending location, so that forces causing the clamping plates 5 to bend are largely avoided.

The sheet metal parts 3 and 4 are made of an adequately rigid material so as to be able to transfer perfectly the forces exerted by the clamping screw 6 on the clamping plates 5 onto the clamping ring 2. In the illustrative embodiment shown, so-called pressure-joint connections 14 are used to connect the sheet-metal parts 3 and 4 to the clamping ring 2, in which pressure-joint connections 14 material sections which are punched out of the sheet-metal part grip through corresponding clamping ring openings punched out at the same time and are compressed on the rear of the clamping ring. This type of connection provides the advantage that it can be simple to manufacture, especially has a high shearing resistance and does not cause any material variations which could impair the fatigue loading capacity of the materials.

Of the two sheet-metal parts 3 and 4, one sheet-metal part 3 is directly attached to the end of the clamping ring 2, whereas a section 15 of the clamping ring projects beyond the other sheet-metal part 4, which section 15 extends beneath the other end of the clamping ring 2 and thus forms a bridge which closes the clamping ring into a complete circle. The edges 16 of the clamping ring 2 are bent inward in the area between the two clamping plates 5 and form the webs gripping over the end faces of the sealing ring 1.

The clamping sleeve described is intended for connecting pipes, in particular cast iron and asbestos-cement pipes. For the same nominal diameter, these pipes can have considerable differences in diameter which still lie within the permissible tolerance range. The clamping sleeve according to the invention ensures that all permissible tolerances are compensated. After the clapping sleeve has been placed onto the pipe ends or the pipe ends have been inserted into the clamping sleeve, in which the sealing ring and the clamping ring form a unit as a result of the edge 16 of the clamping ring bent radially inward, it is sufficient to tighten the clamping screw 6 in order to ensure a sound seal in all respects. By means of the central clamping screw 6, the diameter of the clamping sleeve is first of all reduced until the sealing ring comes into contact with the pipe with the largest diameter. In a manner not shown in greater detail, the seaing ring has a beading projecting inward at its edges, so that in each case the outer edge of the sealing ring sits against the pipe. When the clamping screw 6 is tightened further, the diameter of the clamping sleeve is further reduced in the center area, whereas the diameter of the clamping sleeve at the edge at which the beading of the sealing ring has come into contact with the pipe having the larger diameter is maintained. Thus a conical deformation of the clamping sleeve develops which is terminated when the sealing ring with the beading attached at the other end comes into contact with the pipe having the smaller diameter. The clamping pressure at the two edges of the sealing ring then increases uniformly, by which means a sound seal of both pipes is ensured.

For this operation, it is important that the conical deformation of the clamping sleeve in which the clamping plates 5 assume an inclined position to one another relative to the axial direction of the clamping sleeve is not impaired. Connected with this, is also an inclined position of the clamping plates 5 relative to the clamping screw 6, which inclined position can be assumed unimpeded because the clamping screw 6 is supported at the clamping plates 5 by the intermediate pieces 8 and 9 which, in turn, sit with one partially cylindrical bearing surface B each against the clamping plates 5, which partially cylindrical bearing surface B forms a pivot axis $A_2$ directed generally radially toward the clamping sleeve central axis $A_1$, as best shown in FIGS. 1 and 2. Consequently, the clamping plates 5 are freely pivotable relative to the clamping screw 6 and thus also relative to one another, so that, completely unimpeded, they can assume the inclined position in which the clamping forces exerted on the edges of the sealing ring are essentially the same. Thus a connection of the pipes is produced which is perfect in every respect.

It is of particular importance that, as a result of the use of only one clamping screw, the design of the clamping sleeve and also its handling are particularly simple. In particular, it is not necessary alternately to tighten uniformly two parallel clamping screws, which requires an increased work effort and even more importantly more skill than the tightening of a single, central clamping screw. Furthermore, the guidance of the intermediate pieces at the clamping plates 5 provides for a consistently perfect, central application of the clamping forces.

A further embodiment of the invention shown in FIGS. 5 to 7 consists, in turn, of a rubber-elastic sealing ring 21 and a clamping ring 22 encircling the sealing ring, on the outer side of which clamping ring 22 are fixed two sheet-metal parts 23 and 24 which, in turn, have bent ends forming clamping plates 25. The bending location between the clamping plates 25 and the secions of the sheet-metal parts 23 and 24 fixed to the outer side of the clamping ring 2 is reinforced by beads 41.

The clamping plates 25 are provided with slotted holes 42 which are parallel to the axis of the clamping sleeve and through which extends the otherwise centrally arranged clamping screw 26. In this case, the intermediate pieces 28 are formed by semi-cylindrical bent parts, both of which have a through hole 29 for the clamping screw 26. They each have a bearing surface B' and flat contact surface 30 for the head 27 of the clamping screw 26 or a nut 43 which is a square nut which sits with its lower edge against projections 44 which are arranged on the lower edges of the contact surface 30 formed by the intermediate piece 28. The advantage in using semi-cylindrical intermediate pieces is essentially that they can be made especially simply with minimum material requirement and enable the use of an inexpensive nut which is secured against turing by the seating against the projections 44 and therefore does not need to be specially held during assembly of the clamping sleeve.

The intermediate pieces 28, in turn, are held between bent edge sections 31 and 32 of the sheet-metal parts 23 and 24, so that they are fixed in the center of the clamping plates despite the slotted holes 42 in the clamping plates 25, which slotted holes permit an inclined position of the clamping screw 26.

The clamping ring 22 of the embodiment according to FIGS. 5 to 8 has a further exceptional feature in that it has an inwardly bent edge on its entire length. On the clamping ring section 35 projecting beyond one sheet metal part 24, the distance between the bent edges is reduced to such an extent that this section fits between the bent edges at the other end 36 of the clamping ring. This ensures that the sealing ring 21 is held between bent edges on its entire periphery and therefore cannot yield laterally.

It goes without saying that the invention is not restricted to the illustrative embodiments shown, but rather modifications of these embodiments are possible wtihout leaving the scope of the invention. Thus there is no necessity for the clamping ring to have edges bent radially inward even if the use of such edges provides considerable advantages. The intermediate pieces do not need to be designed in a pipe shape or a shell shape, but can be made of solid material of different type, including plastic. It would also be possible, for example, to provide a pivot mounting for the intermediate pieces. Finally, there are also many possibilities of fixing the position of the clamping pieces. It is merely important that the intermediate pieces are pivotably supported on the clamping plates and consequently guide the clamping screw, so that there is no necessity to provide a guidance of the clamping screw at the clamping plates which disturbes the swivelling capacity.

We claim:

1. In a clamping sleeve for joining pipes which may be of differing diameters and having a rubber-elastic sealing ring which has at least one beading projecting radially inward at each of its ends, a clamping ring which encircles the sealing ring and is in the form of a sheet-metal strip bent in a circular shape about a central axis and on the ends of which are attached opposing clamping plates which extend generally radially outward, and clamping means for drawing the clamping plates toward each other to secure the clamping sleeve in clamping engagement with pipes to be joined and including a clamping screw extending through the clamping plates, the improvement wherein said clamping means includes a pair of intermediate pieces, each of said intermediate pieces being received on said clamping screw outward of an associated one of the clamping plates, each of said intermediate pieces being at least partially cylindrical and defining a partially cylindrical bearing surface engaging an associated one of said clamping plates, each of said intermediate pieces being arranged with the axis of its partially cylindrical bearing surface being parallel to a plane that is perpendicular to said central axis.

2. A clamping sleeve as claimed in claim 1 wherein one of said intermediate pieces comprises a nut threadably engaged with said clamping screw.

3. A clamping sleeve as claimed in claim 1, wherein said intermediate pieces have a cylindrical cross-section.

4. A clamping sleeve as claimed in claim 1, wherein said intermediate pieces have a semi-cylindrical cross-section and a flat stop surface for engagement with an associated portion of said clamping screw.

5. A clamping sleeve as claimed in claim 3, wherein said intermediate pieces comprise bent components, in the walls of which are arranged holes penetrated by said clamping screw.

6. A clamping sleeve as claimed in claim 4, wherein said clamping screw interacts with a nut which has a linear edge section seated against a projection on an associated intermediate piece and which extends outwardly from said flat stop surface of said associated intermediate piece.

7. A clamping sleeve as claimed in claim 6, wherein said nut has a square cross section.

8. A clamping sleeve as claimed in claim 1, wherein said intermediate pieces are held between lateral stops attached to said clamping plates.

9. A clamping sleeve as claimed in claim 8, wherein tangs are arranged at the outer edges of said clamping plates and are bent in U-shape, the legs of which arranged next to the intermediate pieces form the lateral stops.

10. A clamping sleeve as claimed in claim 1, wherein each of said intermediate pieces is restrained from rotating relative to said clamping ring by a stop arranged on the outer edge of the adjacent clamping plate.

11. A clamping sleeve as claimed in claim 10, wherein a tang projects from the outer edge of each clamping plate adjacent an associated intermediate piece and forms said stop.

12. A clamping sleeve as claimed in claim 1, wherein said clamping plates have slots therethrough and said clamping screw extends through said slots.

13. A clamping sleeve as claimed in claim 1, wherein said clamping plates are formed by generally radially outwardly extending end portions of rigid sheet-metal parts attached to said clamping ring.

14. A clamping sleeve as claimed in claim 13, wherein reinforcing beads are arranged in the area of the bend between each of said end portions and an adjacent portion of the each of said sheet metal-parts.

15. A clamping sleeve as claimed in claim 13, wherein the portion of each sheet-metal part seated on said clamping ring has a cut-out extending up to the respective clamping plate and the adjacent end of an associated intermediate piece is received within said cut-out.

16. A clamping sleeve as claimed in claim 13, wherein said sheet-metal parts are fixed to said clamping ring by means of pressure-joint connections.

17. A clamping sleeve as claimed in claim 13, wherein one of said sheet-metal parts is arranged at a distance from the end of said clamping ring and the clamping ring section projecting beyond the sheet-metal part forms a bridge overlapping the other end of said clamping ring.

* * * * *